United States Patent [19]

Katsumoto et al.

[11] Patent Number: 4,765,294
[45] Date of Patent: Aug. 23, 1988

[54] INTAKE DEVICE FOR INTERNAL COMBUSTION ENGINE

[75] Inventors: Takehiko Katsumoto; Osamu Hirako, both of Kyoto; Reijiro Komagome, Jyouyou, all of Japan

[73] Assignee: Mitsubishi Jidosha Kogyo Kabushiki Kaisha, Japan

[21] Appl. No.: 40,855

[22] Filed: Apr. 21, 1987

Related U.S. Application Data

[63] Continuation of Ser. No. 756,096, Jul. 17, 1985, abandoned.

[30] Foreign Application Priority Data

Jul. 18, 1984 [JP] Japan ................... 59-147449
Jul. 1, 1985 [JP] Japan ................... 60-144131

[51] Int. Cl.⁴ ............................................. F22B 5/02
[52] U.S. Cl. ............................ 123/306; 123/188 M
[58] Field of Search ............... 123/306, 188 M, 308, 123/442

[56] References Cited

U.S. PATENT DOCUMENTS

| | | | |
|---|---|---|---|
| 3,008,458 | 11/1961 | Eisele | 123/306 |
| 3,154,059 | 10/1964 | Witzky | 123/188 M |
| 4,240,387 | 12/1980 | Motosugi | 123/188 M |
| 4,256,062 | 3/1981 | Schafer | 123/188 M |
| 4,398,511 | 8/1983 | Nemazi | 123/306 |
| 4,428,334 | 1/1984 | Klomp | 123/306 |
| 4,465,034 | 8/1984 | Tsutsumi | 123/306 |
| 4,467,749 | 8/1984 | Maeda | 123/306 |
| 4,470,386 | 9/1984 | Okumura | 123/306 |
| 4,481,922 | 11/1984 | Sugiura | 123/306 |

FOREIGN PATENT DOCUMENTS

| | | | |
|---|---|---|---|
| 55-40277 | 3/1980 | Japan | 123/306 |
| 58-128418 | 1/1983 | Japan | 123/306 |
| 58-128419 | 1/1983 | Japan | 123/306 |
| 58-195017 | 11/1983 | Japan | 123/306 |
| 58-220923 | 12/1983 | Japan | 123/306 |
| 60523 | 3/1947 | Netherlands | 123/306 |

*Primary Examiner*—Ronald B. Cox
*Attorney, Agent, or Firm*—Abelman Frayne Rezac & Schwab

[57] ABSTRACT

An intake device for an internal combustion engine, in which the intake port is formed to a specific shape without using a partition plate, provided with a valve at its inlet, and the flow direction of intake air to the combustion chambers can be varied by controlling the opening of the valve, thereby providing easy manufacture and reduced cost of the intake port and improved performance when the engine is heavily loaded.

12 Claims, 10 Drawing Sheets

INTAKE DEVICE FOR INTERNAL COMBUSTION ENGINE

This a continuation of application Ser. No. 756,096 filed on July 17, 1985, now abandoned.

FIELD OF THE INVENTION

This invention relates to an intake device for internal combustion engine comprising a combination of a specially shaped intake port and a valve in which the direction of intake gas flow into the combustion chamber can be varied according to the engine load.

BACKGROUND OF THE INVENTION

It is desirable that air taken into a combustion chamber of an internal combustion engine has an adequate swirl so that it is well mixed with fuel. This swirl is generally obtaihed by using a spirally shaped intake port to give a directivity of air flow. When the engine is lightly loaded, a swirl of air occurs to facilitate mixing with fuel thereby improving the fuel efficiency. However, when the engine is heavily loaded, intake air flow is impeded by the spirally shaped intake port depending on its shape which will result in decreased filling efficiency. It is therefore necessary to provide effective means for preventing such a problem. For this purpose, the intake port has been provided with a parted port by a partition plate or a separate port having a valve to vary the magnitude of swirl.

However, such provision of the parted port or the separate port with valve makes the the intake port complex in structure which is disadvantageous in view of operation, manufacture and cost.

OBJECT OF THE INVENTION

It is a primary object of the present invention to provide an intake device which is easy to manufacture, low in cost and with improved performance when the engine is heavily loaded. In accordance with the the present invention which attains the above object, there is provided an intake device without a partition plate or others, comprising a specially shaped intake port and a valve at the inlet side of the intake port for controlling the rate and direction of air flow according to engine load.

SUMMARY OF THE INVENTION

The intake device according to the present invention comprises a straight section forming an upper half part of cross-section along the air flow direction of an intake port to a combustion chamber of an internal combustion engine, a spiral section forming a lower half part of said cross-section and having a spiral chamber surrounding an intake valve, a valve operating substantially the upper half part disposed near the inlet of the intake port, and an opening/closing mechanism for controlling the valve according to engine load.

Thus, the intake port is integrally composed of the straight section and the spiral section, and the inlet side of the intake port is provided with the valve. The valve is controlled so that flow rate to the spiral section is increased to produce a swirl in the intake air when the engine is lightly loaded and that a sufficient intake air flow rate to the combustion chamber is ensured by the straight and spiral sections when the engine is heavily loaded, thereby preventing decrease in performance. Further, the intake port is integrally formed to a special shape, without a partition plate, thereby providing easy manufacture and reduced cost of the intake port.

DETAILED DESCRIPTION OF PREFERRED EMBODIMENTS

Figure 1:
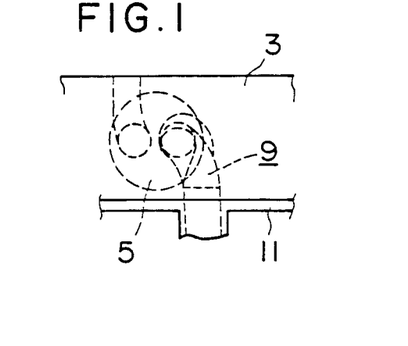
FIG. 1 is a schematic view showing the main part of an intake device according to the present invention.
Figure 2:
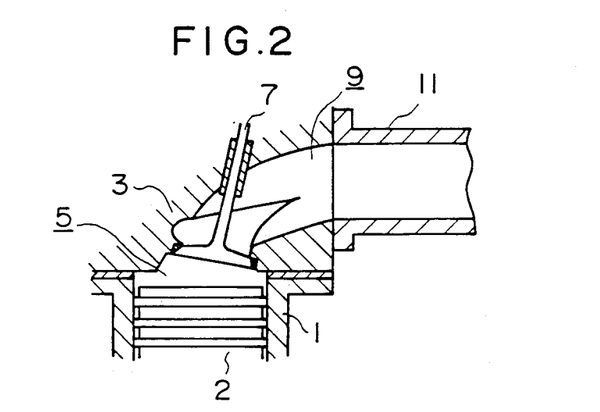
FIG. 2 is a schematic sectional view showing the internal structure of the intake device.
Figure 3:
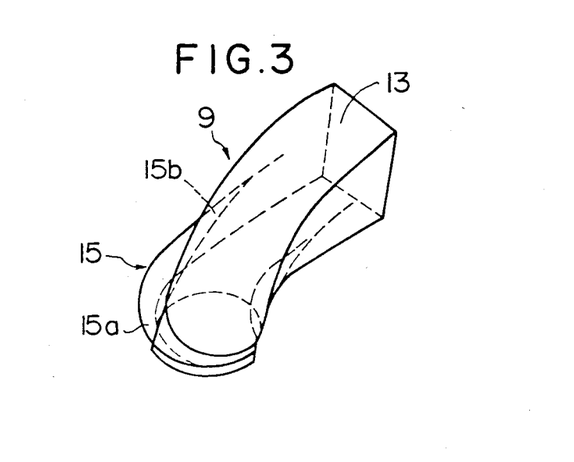
FIG. 3 is an oblique view showing the shape of an intake port of the intake device according to the present invention.
Figure 4:
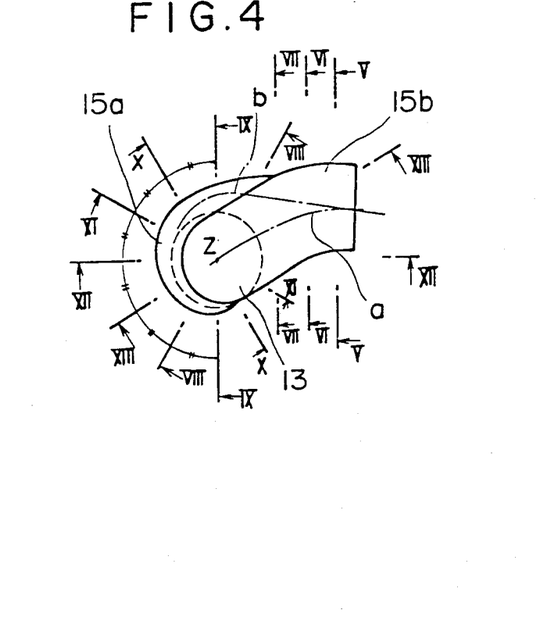
FIG. 4 is a top view of the intake port.

A first embodiment of the intake device according to the present invention will be described in detail with reference to FIGS. 1 to 3.

In the figures, numeral 1 indicates a cylinder block, numeral 2 indicates a piston reciprocally moving in the cylinder block 1, numeral 3 indicates a cylinder head fixed onto the cylinder block 1, numeral 5 indicates a combustion chamber formed between the piston 2 and cylinder head 3, numeral 7 indicates an intake valve, numeral 9 indicates an intake port, and numeral 11 indicates an intake manifold fixed to the intake port. There is provided an ignition plug, which is not shown in the figures, in the combustion chamber 5, and the upstream of the intake manifold 11 is provided with a throttle valve, which is not shown, to control the flow rate of intake air.

FIGS. 3 to 13 schematically show the shape of the intake port 9. The intake port 9 is integrally and doubly composed of a straight section 13 positioned at the upper half part of cross-section along the intake air flow and a spiral section positioned at the lower half part of cross-section. The straight section is slanted from the side of the cylinder head 3 towards the combustion chamber 5 and curvingly formed as shown with a flowing center line a in FIG. 4, so that intake air flows down almost directly from the upper part towards the combustion chamber 5 without strong turbulence. The spiral section 15 comprises a spiral chamber 15a and a straight part 15b which is tangentially connected with the spiral chamber 15a as shown by a flowing center line b in FIG. 4, in which intake air flows tangentially from the straight part 15b into the spiral chamber 15a so that a strong turbulence is produced around the intake valve 7 towards the combustion chamber 5.

Figure 5:
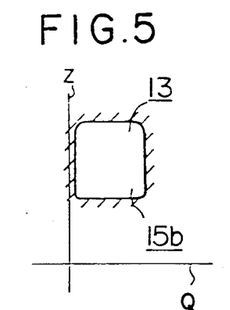
FIGS. 5 to 13 are side views, top views and oblique views taken along lines V—V, VI—VI, VII—VII, VIII—VIII, IX—IX, X—X, XI—XI, XII—XII, and XIII—XIII in FIG. 4.
Figure 6:
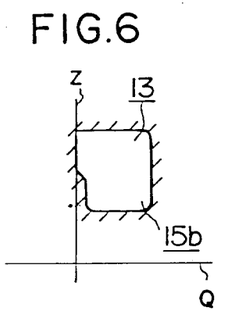
Figure 7:
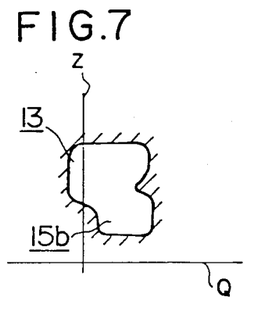
Figure 8:
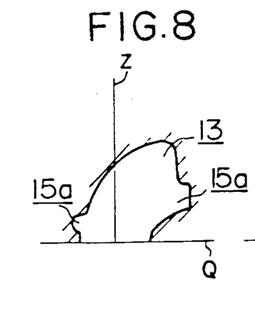
Figure 9:
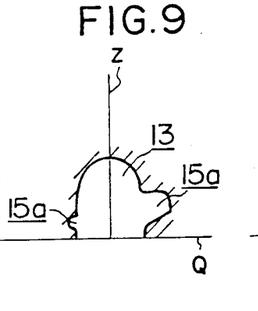
Figure 10:
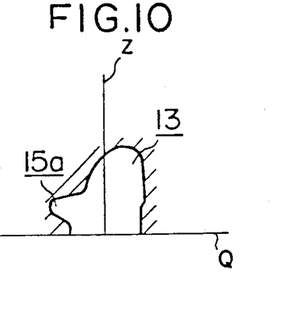
Figure 11:
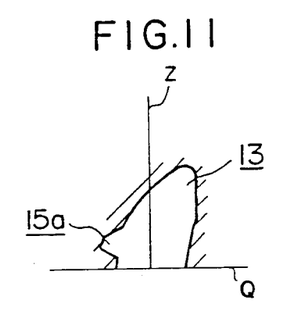
Figure 12:
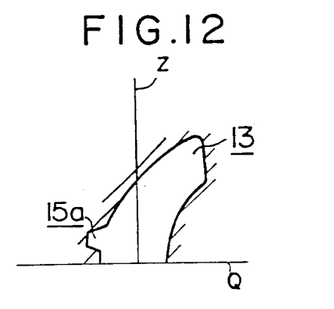

Further, the sectional shape of the intake port 9 will be described in detail with reference to FIGS. 5 to 13, with respect to a central axis Z of the intake valve 7 and a bottom surface Q of the cylinder head 3. The cross-section of the inlet is formed to a rectangle for example of approximately 30 mm.×30 mm. as shown in FIG. 5. The straight part 13 and the straight part 15b of the spiral section 15 are disposed at the upper and lower halves respectively of the cross-section. The downstream part is also provided with the straight part 13 and the spiral chamber 15a of the spiral section 15 at the upper and lower half parts respectively as shown in FIGS. 6 to 13, so that air flows are combined near the intake valve 7.

Figure 14:
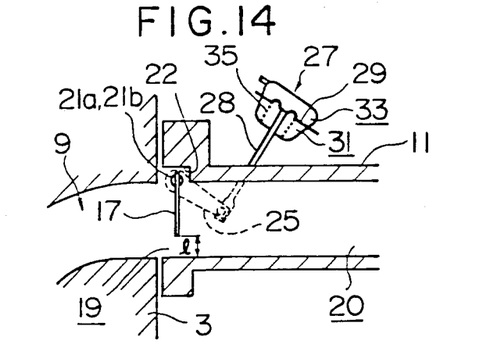
FIG. 14 is a schematic structural view showing a first embodiment of the present invention.

Next, a valve and a valve opening/closing mechanism for controlling intake air flow to the intake port 9 will be described with reference to FIGS. 14 to 16. A valve 17 is disposed near the downstream end of the intake manifold 11 mounted to the cylinder head 3 so that an intake manifold passage 20 communicates with the intake port 9. The valve 17 has a shape that when fully closed it closes substantially only the upper half of the intake port 9 and provides a gap 19 at the lower half. Height 1 of the gap 19 is preferably for example about 5 to 15 mm. or ½ to 1/6 of the height of the intake manifold passage 20 or the intake port 9. The value is set to give a swirl ratio of about 5 at which an improved fuel efficiency is experimentally obtained when the engine is lightly loaded, particularly for idling. The "swirl ratio" is referred to the number of swirls per intake-to-intake stroke in the cylinder.

The valve opening/closing mechanism consists of shafts 21a and 21b a lever 25, and a vacuum motor 27 as described below. Each intake port 9 of a plurality of combustion chambers (four chambers in FIG. 15) communicates with each intake manifold passage 20. The shafts 21a and 21b are mounted on the top of the valve 17 disposed in two adjacent intake manifolds 20 of the intake manifold 11 and supported penetrating the intake manifold 11. These shafts 21a and 21b are connected with a connecting member 23 at the center of the intake manifold 11 and the lever 25 is attached to the end of the shaft 21a. The joint of the shafts 21a and 21b and the valve 17 is positioned in a recess 22 formed at the downstream-side end surface of the intake manifold. Numeral 27 indicates a vacuum motor which is divided into two chambers 31 and 33 by a diaphragm 29 having an output load 28 connected to the lever 25. The chamber 31 is provided with a return spring 35 applying a tensile force which connects the bottom face of the vacuum motor 27 and the diaphragm 29, and the chamber 33 communicates with the intake manifold passage 20 so that a negative pressure of the intake manifold is applied to the chamber.

Tensile force of the return spring 35 should preferably be a value so that the valve 17 is fully opened when the intake manifold negative pressure produced by the operation of the throttle valve which is not shown is $-100$ mmHg. to $-200$ mmHg. When the intake manifold negative pressure decreases for heavy-loaded running, the valve is opened by the force of the return spring 35.

Figure 16:
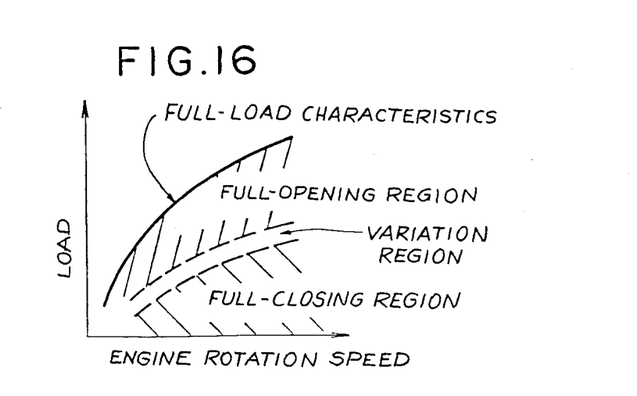
FIG. 16 is a curve showing valve characteristics.

FIG. 16 shows characteristics indicating the full-opening and full-closing regions of the valve 17, and the variation region between the full-opening and full-closing regions.

Operation of the above arrangement will now be described below. When the engine is operated with a light load, the intake manifold negative pressure is high. The negative pressure is supplied to the chamber 33 of the vacuum motor 27, the diaphragm 29 is moved up against the tensile force of the return spring 35 and, at the same time, an output rod 28 is moved to keep the valve 17 closed through the lever 25 as shown in FIG. 14.

As a result, air taken into the combustion chamber 5 passes through the gap 19 in the lower part of the valve 17 and flows along the lower half part of the intake port 9. Then, a swirl is produced in the combustion chamber by the spiral section 15 formed at the lower part of the intake port 9. The swirl ratio at this time is set to approximately 5.

When the engine is operated with a high load and the intake manifold negative pressure decreases below a preset value of $-100$ mmHg. to $-200$ mmHg., the compressive force of the return spring 35 becomes greater than the intake manifold negative pressure and the diaphragm 29 is moved downward. At the same time, the output rod 28 is moved to start opening the valve 17 through the lever 25. The valve 17 is opened according to the change in the intake manifold negative pressure until the valve is fully opened. This causes intake air introduced into the combustion chamber 5 to flow along the straight part 13 at the upper part of the intake port 9 and the spiral section 15 at the lower part of the intake port 9, resulting in decreased intake resistance. As a result, sufficient air is supplied to the combustion chamber and the swirl ratio is reduced.

In the first embodiment of the present invention, the intake port 9 has a double structure comprising the straight section 13 and the spiral section 15, and the inlet of the intake port is provided with the valve 17 which is opened and closed according to the engine load. By virtue of such an arrangement of the intake port, the valve 17 is fully closed when the engine is operated with a light load and air taken into the combustion chamber passes through the gap 19 at the lower part of the valve 17 and flows along the lower part of the intake port 9. A swirl is produced by the spiral section 15 at the lower part of the intake port 9. This accelerates mixing of air and fuel, thereby providing improved combustion efficiency and hence improved fuel efficiency, and stabilized combustion when an EGR is used which tends to result in combustion instability, or stabilization of lean combustion. When the valve 17 is fully opened, a volume efficiency of the same level as of a conventional straight port can be assured and there occurs no reduction in full-opening output performance associated with decreased volume efficiency which is seen in a conventional helical port.

Figure 17:
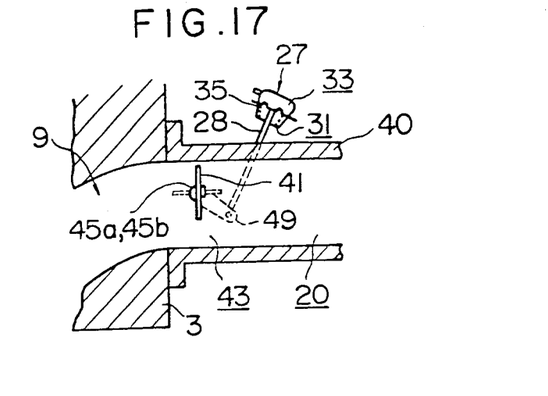
FIG. 17 is a schematic structural view showing a second embodiment of the present invention.
Figure 18:
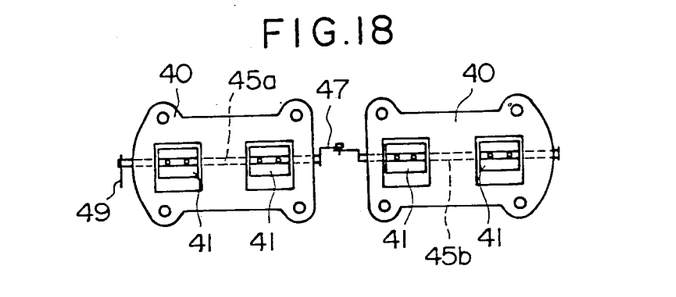
FIG. 18 shows its right side view.

A second embodiment of the present invention will be described with reference to FIGS. 17 and 18. The same reference numerals are used to designate the same parts used in the first embodiment, and such parts are not described here. Numeral 41 indicates a valve disposed near the downstream end of the intake manifold 40 so that the intake manifold passage 20 communicates with the intake port 9. The valve 17 has a shape that when fully closed it closes substantially only the upper half of the intake port 9 and provides a gap 43 at the lower part. Height 1 of the gap 43 is preferably about 5 to 15 mm. or ⅓ to 1/6 of the height of the intake manifold passage 20 as for the first embodiment.

Numerals 45a and 45b are shafts which are fixed nearly to the vertical center of the valve 41 disposed in two adjacent intake manifold passages 20 of the intake manifold 40, each intake manifold passage 20 communicates with each intake port 9 of a plurality of combustion chambers (four chambers in FIG. 9) as in the first embodiment, and supported penetrating the intake manifold 40. These shafts 45a and 45b are connected with a connecting member 47 at the center of the intake manifold 40 and a lever 49 is attached to the end of the shaft 45a. The lever 49 is connected to the output rod 28 of the vacuum motor 27.

By virtue of the above arrangement, the second embodiment of the present invention provides the same operation and effects as of the first invention.

Since the shafts 45a and 45b supporting the valve 41 pass through the intake manifold passage 20, there is no need of the recess 22 as provided at the mounting positions of the shafts 21a and 21b in the first embodiment, and the intake manifold can be easily machined and manufactured.

Figure 19:
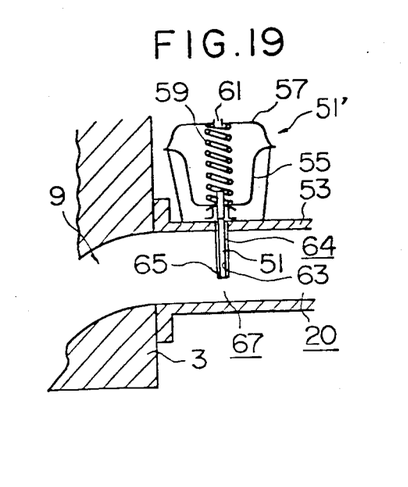
FIG. 19 is a schematic structural view showing a third embodiment of the present invention.
Figure 20:
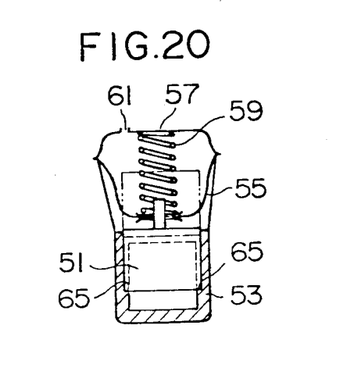
FIG. 20 shows its right side view.

A third embodiment of the present invention will be described with reference to FIGS. 19 and 20. The same reference numerals are used to designate the same parts used in the first embodiment, and such parts are not described here. Numeral 51 is a valve which is provided slidably in the vertical direction in the intake manifold passage 20 of an intake manifold 53 attached to the cylinder head 3. Numeral 51' is an opening/closing mechanism for controlling the valve 51, which will be described below. Numeral 55 is a diaphragm which is connected to the upper part of the valve 51 and partitions a case 57. Numeral 59 is a spring having a tensile force which connects the diaphragm 55 and the top surface of the case 57.

Numeral 61 indicates a communication hole formed on the top surface of the case 57, which opens the upper side chamber of the diaphram 55 to the atmosphere. Numeral 63 is a guide groove formed vertically in the intake manifold passage 20, in which the valve 51 slides vertically, and provides communication between the intake manifold passage 20 and the lower side chamber of the diaphragm 55. Numeral 65 is a stopper formed at the lower end of the guide groove, which determines the lower sliding end position of the valve 51.

In the fully closed state of the valve 51 at the lower end, there is formed a gap 67 under the valve 51, which communicates with the lower half of the intake port 9. Size of the gap 67 is preferably to be 5 to 15 mm. or ⅓ to 1/6 of the height of the intake manifold passage 20 as for the first embodiment.

With the structure of the third embodiment, negative pressure in the intake manifold is high when the engine is operated with a light load. Thus, negative pressure at the lower side of the diaphragm 57 increases, the diaphram is pulled down against the tensile force of the spring 59, the valve 51 is closed, and a swirl is produced in the combustion chamber. When the engine is operated with a heavy load, pressure in the intake manifold 53 is near the atmospheric pressure, the valve 51 is pulled up by the tensile force of the spring 59 and fully opened, resulting in suppressed swirl.

Figure 21:
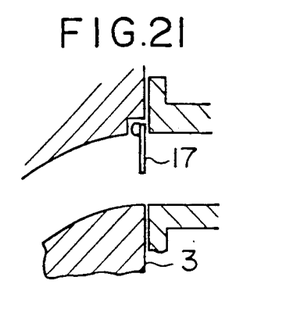
FIG. 21 is a sectional view showing a modification of the first embodiment of the present invention.
Figure 22:
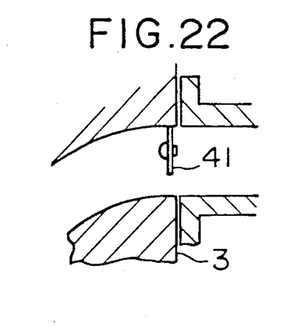
FIG. 22 is a sectional view showing a modification of the second embodiment of the present invention.

In the valve structure described in the first, second and third embodiments, the valve 17 of the first embodiment or the valve 41 of the second embodiment can be provided at the cylinder head 3 side as shown in FIGS. 21 and 22, instead of the downstream end of the intake manifold, with the same effects as of the above embodiments.

Modified opening/closing mechanisms for opening and closing the valve will be described below. First, a modification of the vacuum motor 27 for opening and closing the valve 17 of the first embodiment is described as a fourth embodiment of the present invention with reference to FIGS. 23 and 24. The fourth embodiment is the same as the first embodiment except that supply of negative pressure to the vacuum motor 27 is controlled according to the rotation speed and load of the engine. The same reference numerals are used to designate the same parts used in the first embodiment, and such parts are not described here. Numeral 71 indicates a solenoid valve which is provided with a port 73 communicating with the intake manifold passage 20, a port 75 opened to the atmosphere, and a port 77 communicating with a chamber 33 of the vacuum motor 27. The valve 71 is a 3-way solenoid valve to select communication of the port 73 with the port 77 (indicated with an arrow P in FIG. 23) and that of the port 73 with the port 75 (indicated with an arrow Q in FIG. 23) according to signal from a computer 79. The computer 79 receives signals from a throttle opening sensor 81, and an engine speed sensor 82, and according to the received signals it outputs operation signals to the solenoid valve 71.

The computer 79 controls opening of the valve 71 according to characteristics for example as shown in FIG. 34, fully closing the valve 71 in a light loaded, low-speed range of the engine, and fully opening it in a high-speed range. Since the fuel efficiency of the engine is not much affected by the loading and speed conditions of the engine in the high-speed, light-loaded range, it is not necessary to give a strong swirl to intake air and the valve is controlled to fully open.

Figure 13:
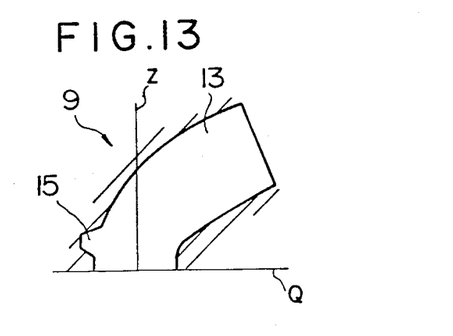

The return spring 35 is set so that the diaphragm 29 is positively moved and closed with an intake manifold negative pressure in the full-closing region of the characteristic curves shown in FIG. 13.

The operation of the above arrangement will now be described below. When an operation signal is transmitted from the computer 79 to the solenoid valve 71, the port 73 is made communicating with the port 77, the intake manifold negative pressure is supplied to the chamber 33 of the vacuum motor 27, the diaphragm 29 is moved against the force of the return spring 35, and the valve 17 is kept fully closed. When the engine operation is within the full-opening region of the characteristic curves shown in FIG. 24, the operation signal from the computer 79 to the solenoid valve 71 is turned OFF, the chamber 33 of the vacuum motor 27 is opened to the atmosphere, and the valve 17 is fully opened by the force of the return spring 35. Thus, the valve 17 is alternatively controlled to be fully opened or closed according to the load and speed of the engine.

Figure 23:
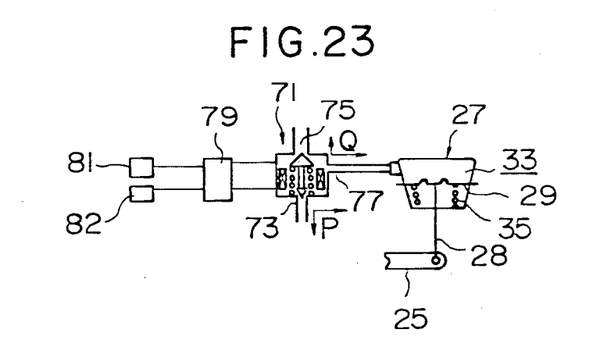
FIG. 23 is a schematic structural view of a fourth embodiment of the present invention which shows another opening/closing mechanism of the first embodiment.
Figure 24:
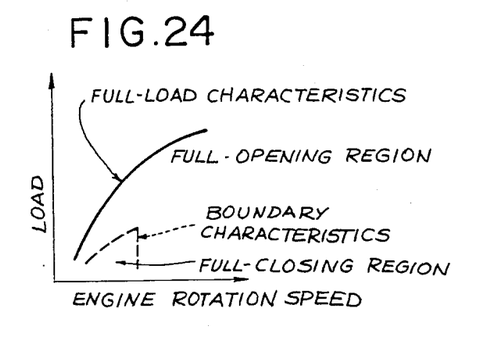
FIG. 24 is a curve showing its valve characteristics.

In the fourth embodiment of the present invention, since opening and closing of the valve 17 is controlled according to the load and speed of the engine, the intake device is controlled to a more adequate intake swirl matching the operating conditions of the engine than in the first embodiment in which the intake device is controlled according to the engine load only, thereby providing further improved fuel efficiency and output performance.

Fuel efficiency for idling can be improved when the engine idling is determined from the engine speed and load signals and the valve 17 is controlled so that it is fully closed for idling only.

The above opening/closing mechanism can also be applied to the valve 41 of the second embodiment of the present invention with the same improvement effects.

Figure 25:
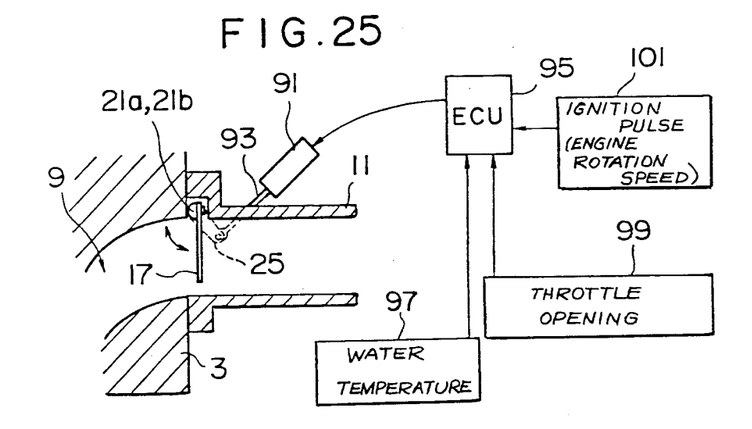
FIG. 25 is a schematic structural view of a fifth embodiment of the present invention which shows another opening/closing mechanism of the first embodiment.
Figure 26:
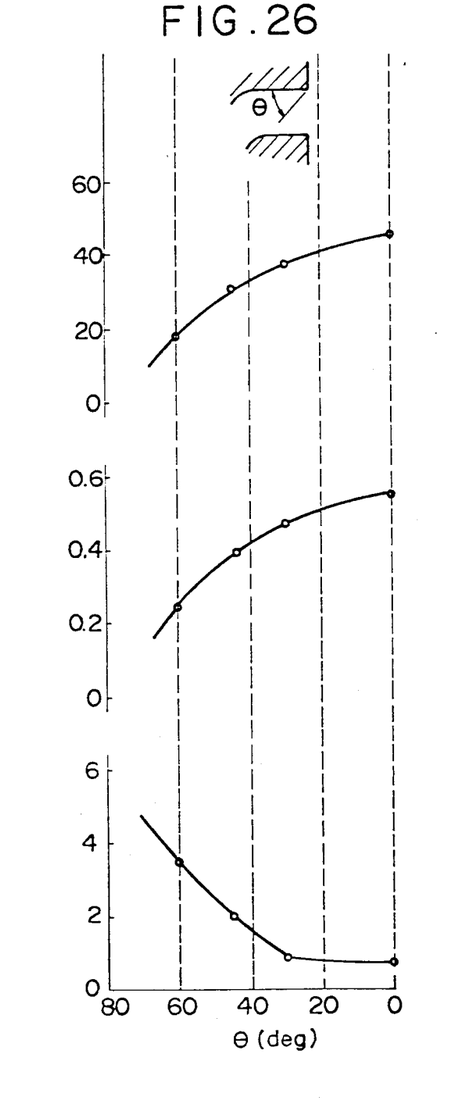
FIGS. 26 and 27 are curves showing its valve characteristics.
Figure 27:
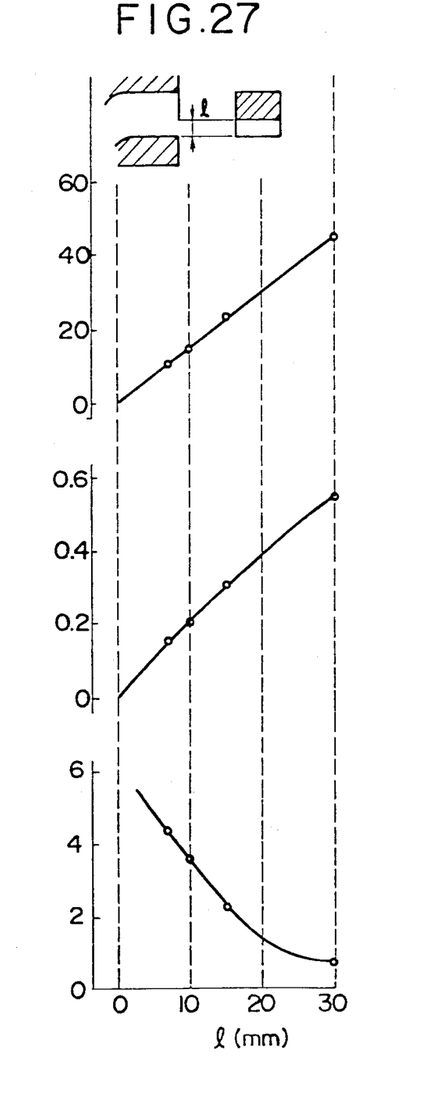

A fifth embodiment of the present invention in which the valve 17 is continuously controlled by a stepping motor 91 in place of the vacuum motor 27 employed in the first embodiment will be described with reference to FIGS. 25 and 26. The same reference numerals are used to designate the same parts used in the first embodiment, and such parts are not described here.

An output shaft 93 of the stepping motor 91 is connected to the lever 25, and projection of the output shaft 93 is controlled by a computer 95. The computer 95 receives signals from a water temperature sensor 97, a throttle opening sensor 81 and an engine speed sensor 82 and outputs control signals to the stepping motor 91. For example, the valve is fully closed during idling of the engine, opened 45 degrees when the vehicle is running at a speed of 40 kg./hour, and fully opened when the engine is fully loaded.

Figure 15:
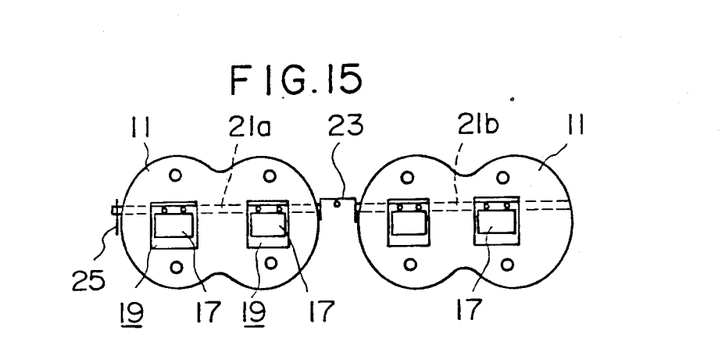
FIG. 15 shows it right side view.

FIG. 15 shows an experimental result of air intake condition of the intake port 9 to the combustion chamber 5, showing an average swirl ratio and an average flow index from the full-opening position of the valve 17 to a position where the valve is closed $\theta$ degrees, an a flow rate (liter/sec.) when the valve is lifted by 10 mm. For example, the average swirl ratio varies from 1 to 3.5 as $\theta$ changes from 0 to 60 degrees. From the above, the computer 95 determines the operating condition of engine, and based on the data shown in FIG. 26 it outputs control signals to the stepping motor 91 so that the valve 17 is opened $\theta$ degrees where the optimum intake condition for the engine is obtained. Thus, the valve 17 is continuously controlled for the optimum operating condition of the engine, not alternatively to full opening or full closing of the valve, thereby providing further improved fuel efficiency and output performance of the engine.

The structure of the fifth embodiment of the present invention can also be applied to the valve in the second and third embodiments with the same improvement effects. FIG. 26 shows the relation between the dislocation of the valve 51 and average swirl ratio, average flow index and flow rate (liter/sec.) for 10 mm. lifting of the valve when applied to the operation of the valve 51 in the third embodiment of the present invention. Utilizing this relation, the valve 51 can be continuously controlled to the optimum opening according to the operating condition of the engine.

Figure 28:
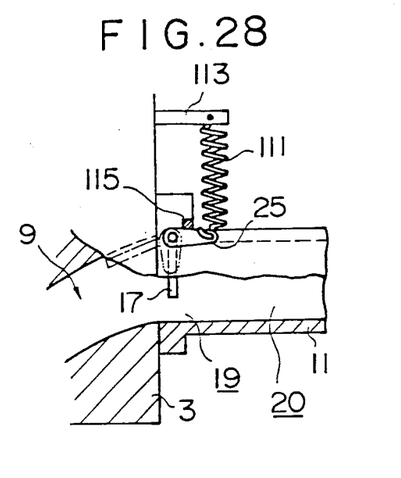
FIG. 28 is a schematic structural view of a sixth embodiment of the present invention which shows another opening/closing mechanism of the first embodiment.
Figure 29:
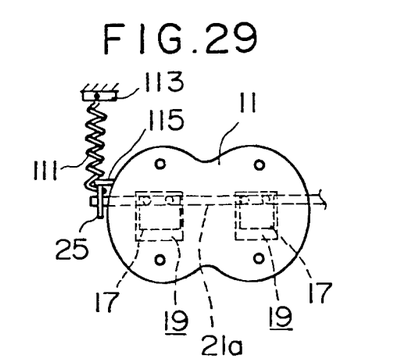
FIG. 29 shows its right side view.

A sixth embodiment of the present invention in which the opening/closing mechanism for the valve 17 differs from that employed in the first embodiment will be described with reference to FIGS. 28 to 30. The same reference numerals are used to designate the same parts used in the first embodiment, and such parts are not described here. Numeral 111 indicates a spring, one end of which is supported by a supporting member 113 fixed to the cylinder head 3 and the other end is attached to the lever 25 with a tensile force. Numeral 115 indicates a stopper which is a member fixed to the intake manifold 11, contacts against the lever 25, and positions the valve 17 to the full-closing position.

Figure 30:
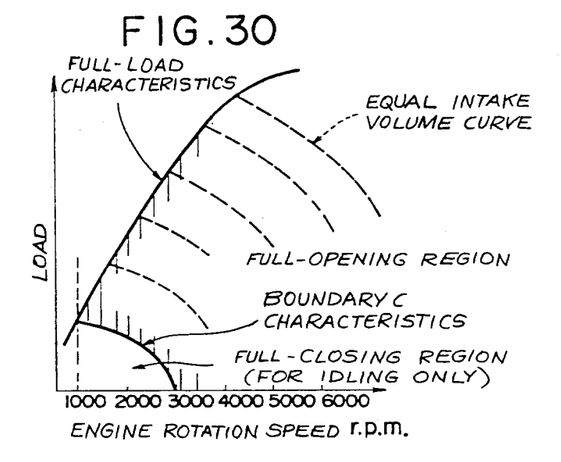
FIG. 30 is a curve showing its valve characteristics.

The tensile force of the spring 111 is set to the characteristics shown in FIG. 30. Thus, it is set so that the valve 17 is fully closed at the time of idling operation of the engine and fully opened by an intake air flow at the time the engine is operating at 1,000 r.p.m. with the full load.

The operation of the mechanism will now be described below. When the engine is in idling operation, the valve 17 is pulled by the tensile force of the spring 11 and contacts against the stopper 115, thereby kept at the fully closed position. As the intake air flow rate increases with the rotation speed and load of the engine, pressure of the air flow to the valve 17 increases, the valve 17 is opened according to the intake air flow rate until the boundary characteristic line in FIG. 30, a line determined by the intake air flow characteristics at 1,000 r.p.m. with full load, where the valve is fully opened.

Thus, the valve 17 can be continuously controlled from the full-closing position to the full-opening position by the pressure of intake air flow applied to valve, and the full-opening condition can be freely set by the tensile force of the spring 111 only, thereby providing the same effects as of the first embodiment of the present invention.

We claim:

1. An air inlet for a valve controlled internal combustion engine having a cylinder head within which an inlet valve is reciprocable relative to a valve seat and which air inlet includes an air inlet passage means for partial closure of said passage, the improvement comprising:

said cylinder head being formed with an intake port extending from one side of said cylinder head toward substanially the center of said valve seat, said intake port comprising a straight section and a spiral section arranged along the direction of intake air flow and defining an upper half and a lower half respectively in a vertical section of said cylinder head, said spiral section including a portion of said straight section and further including a swirl producing chamber, said swirl producing chamber extending laterally outwardly beyond the outer periphery of said straight section at a position adjacent to and preceeding said valve seat, said straight section communicating with a combustion chamber through said valve seat; whereby operation of said closure means results in flow being directed to the lower portion of said straight section and being diverted to said swirl producing chamber of said spiral section; said straight section, when unobstructed, providing for flow directly into said valve seat in the substanial absence of swirl.

2. The air inlet of claim 1, in which said closure means is pivoted for rotation about an upper edge thereof with respect to the cylinder axis.

3. The air inlet of claim 1, in which said closure means is pivoted for rotation at a position intermediate upper and lower edges thereof.

4. The air inlet of claim 1, in which said closure means is slidably mounted for vertical movement.

5. The air inlet according to claim 1, including means for controllably moving said closure means operative to move multiple said closure means of a multiple cylinder internal combustion engine in unison with each other thus to provide a variable intake-swirl producing mechanism in combination with respective said inlet passages and swirl chambers of the respective cylinders.

6. The air inlet according to claim 1, including means for controllably moving said closure means comprising a vacuum motor operated by negative pressure existing in an intake manifold of said engine, thus to provide a variable intake-swirl producing mechanism.

7. The air inlet according to claim 6, in which said supply of negative pressure to said vacuum motor is controlled in accordance with the speed of the engine and the load imposed upon said engine.

8. The air inlet according to claim 1, in which said means for controllably moving said closure means is a stepping motor.

9. The air inlet according to claim 8, in which said stepping motor is controlled in dependence on the rotational speed, the throttle opening, and the water temperature of said engine.

10. The air inlet according to claim 2, in which said means for controllably moving said closure means a tension spring acting in opposition to forces exerted on said closure means by air flow past said closure means.

11. The air inlet according to claim 10, in which said spring has a rate permitting said closure means to move from a first to a second position at all times when said engine is operating under full load and at a speed in excess of one thousand rpm.

12. The air inlet of claim 4, in which said means for controllably moving said closure means is a diaphragm motor incorporating a compression spring which maintains said closure means in a second position under heavy loading of said engine, and which progressively moves said closure means against the bias of said spring toward a first position as the load on said engine decreases.

* * * * *